United States Patent [19]

Grunwald

[11] Patent Number: 4,880,303
[45] Date of Patent: Nov. 14, 1989

[54] OVERHEAD PROJECTOR

[76] Inventor: Peter-Hein Grunwald, Schlattstrasse 215, FL 9491 Ruggell, Fed. Rep. of Germany

[21] Appl. No.: 155,202

[22] Filed: Feb. 12, 1988

[30] Foreign Application Priority Data

Feb. 16, 1987 [DE] Fed. Rep. of Germany ....... 3704762
Apr. 16, 1987 [DE] Fed. Rep. of Germany ....... 3712999

[51] Int. Cl.$^4$ ...................... G03B 21/20; G03B 21/132
[52] U.S. Cl. .............................. 353/122; 353/DIG. 3; 353/119
[58] Field of Search .................. 353/DIG. 3, DIG. 5, 353/DIG. 6, 98, 99, 119, 122, 120, 121, 52, 55, 56, 95, 96, 102

[56] References Cited

U.S. PATENT DOCUMENTS

| | | | |
|---|---|---|---|
| 2,852,980 | 9/1958 | Schroder | 353/55 X |
| 3,807,850 | 4/1974 | Ozeki | 353/23 |
| 3,837,738 | 9/1974 | Kato | 353/23 |
| 4,338,006 | 7/1982 | Ozeki | 353/DIG. 3 X |
| 4,453,810 | 6/1984 | Curiel | 353/55 |
| 4,613,207 | 9/1986 | Ferfason | 353/122 X |

FOREIGN PATENT DOCUMENTS

| | | | |
|---|---|---|---|
| 0019924 | 2/1984 | Japan | 353/DIG. 6 |
| 0213935 | 10/1985 | Japan | 353/DIG. 3 |

Primary Examiner—Harry N. Harrian
Attorney, Agent, or Firm—Robert E. Burns; Emmanuel J. Lobato

[57] ABSTRACT

An overhead projector comprises a housing the upper side of which is closed by a transparent writing plate under which there is a Fresnel lens. A lamp in the housing is provided with a cold light reflector and a condenser lens for directing light upwardly through the Fresnel lens and writing plate. A projection head mounted above the writing plate on a support arm extending up from the rear side of the housing and comprising an objective lens and a deflection mirror directs the light received from the lamp through the Fresnel lens and writing plate onto a projection screen. A liquid crystal display in a frame hingedly mounted on the rear side of the housing can be swung between an operative position overlying, but spaced from the writing plate and an idle position up against the support arm where it is held by a magnet. The liquid crystal display is controlled by a computer disposed in the housing and fed from a common power supply for the lamp and a ventilating fan located in the housing for cooling the lamp, computer and liquid crystal display. The support arm is hinged so that it can be swung down to a travel position overlying the liquid crystal display and may be recessed on its forward side to accommodate the liquid crystal display.

15 Claims, 7 Drawing Sheets

OVERHEAD PROJECTOR

The invention relates to an overhead projector comprising a light source with a lamp reflector and a condenser, a housing accommodating a Fresnel lens and a writing plate, a support arm mounted on the housing, a projection head comprising an objective and deflection mirror mounted on the support arm, which is provided with a ventilator and a power supply unit or transformer and which is equipped with a liquid crystal display (LCD) in a frame which can be laid on the writing plate.

Such overhead projectors are known for the projection of translucent films which can be placed on the writing plate and written on during the projection. As a supplement to these overhead projectors there are liquid crystal displays (LCDs), which are mounted in a frame which is laid on the writing plate of the overhead projector and irradiated by the light of the overhead projector. This display is connected by a cable connection with a control unit which in turn is connected with a computer provided with suitable software. The projection with this attachment often succeeds only moderately because the irradiating light imparts so much warmth to the display that the liquid crystals oriented by the electric field fall into disorder. The projection with this attachment is complicated because the user who wishes ultimately to project the display and projection film must remove the display from the writing plate before the projection of film and for a new projection with the display must again install the display on the writing plate. As the user of the overhead projector as a rule in this use holds a lecture paper this back and forth changing disturbs the user in his lecture.

Further disturbance arises from the computer which is fed from a separate power supply which in general is equipped with a not low noise ventilator. This ventilator noise raises no problem during the former use of a computer in offices and similar work stations because there the noise level is generally so high that the ventilator noise is submerged. However, that is not the case in a lecture in particular in a small group in a conference in which only a few people take part. Hence the ventilators in overhead projectors which serve to cool the light source and the power supply are provided with an especially quiet drive.

The present invention avoids these objections of the state of the art. It is the object of the invention to provide an overhead projector equipped with a liquid crystal display which is especially easy to use and which, through its particular construction, assures the user of a disturbance-free lecture.

The invention consists in that the liquid crystal display is hingedly mounted on the upper surface of the housing, that the hinge joints are mounted on that side of the upper surface of the housing on which the support arm for the projection head is arranged, that a cable is led out of the housing on this side which on this side is led into the frame of the display and that on the side of the frame of the display opposite the hinge joints and/or on the support arm there is provided a device for fastening the frame of the display on the support arm.

With this overhead projector a disturbance-free lecture is made possible because it is no longer necessary to displace the display from the writing plate to the support table of the projector adjacent the projector when the lecturer desires to show a film in the projection picture instead of the display. The lecturer merely swings the display upwardly from the writing plate where a fastening device serves to hold the display in a substantially vertical position on the support arm so that a film laid on the writing plate can be projected without the picture of the display. For a renewed projection of the display it is simply necessary to swing this down again. It cannot be broken through clumsiness of the lecturer in being removed from the writing plate and it is always ready for projection when illuminated by the projection light source. With this overhead projector it is also possible to project sharply films and the display simultaneously because the film can be laid under the display which through its feet is spaced so far from the writing plate that a film fits into the space between the display and the writing plate.

It is advantageous when in the housing or in a base under the housing, which is connected with the housing by a cable plug-in connection, there is arranged a computer with its power supply as well as a control unit connected between the computer and the liquid crystal display.

Through this arrangement of the computer and its control unit it is achieved that this no longer stands alongside of the overhead projector on a table and there takes away space from the lecturer and disturbs him in picking up and replacing the films to be projected.

This close spatial connection of the computer and its control unit to the overhead projector brings the further advantage that the computer and/or the control unit can be fed from the power supply or the transformer of the overhead projector, preferably through a special tap or a special power supply or a further transformer.

It is usual that today overhead projectors are equipped with low voltage lamps of which the voltage is usually 24V. The transformers or power supply units in overhead projectors are so designed that they not only supply sufficient current to the light source and the ventilator, but also have a reserve capacity sufficient for the power requirements of the computer and the control unit. Hence the supply voltage for the computer and the control unit is reduced. As these work with a voltage of lower than 24 volts, a special tap is provided on the transformer or a special output is provided on the power supply or simply to the power supply or the transformer which supplies 24 volts for the light source and the ventilator there is connected to a further power supply or a further transformer which simply has a transformation of 1:4 instead of the usual transformation of 1:40. Such apparatus is small, produces little heat loss and requires no separate ventilator.

In its swung-up position, the liquid crystal display is out of the beam of the light source of the overhead projector. At this time in which the liquid crystal display is swung up, no heat enters the display and heat present is dissipated from the display. By long use, this is frequently not sufficient. Therefore, it is advantageous when the reflector of the light source is a cold light reflector which allows red and infra-red rays to pass through it and when just above the condenser lens, there is arranged a glass plate which on the side turned toward the condenser lens has a red and infra-red component reflecting layer and which on the side turned away from the condenser lens is provided with an anti-reflecting layer.

This design reduces the component of the especially heat producing rays in the light beam of the overhead projector so that the liquid crystal display is heated only a very insignificant amount. It is thereby assured that a color alteration of projected color films is not, or only to a very limited extent, perceptible. This arrangement is very much better than a direct coating of the condenser lens. The direct coating of the condenser lens leads thereto that the corners of the projected pictures appear in blue color tones.

When the computer and the control apparatus are installed directly in the housing of the overhead projector it is advantageous when the computer and the control apparatus are installed laterally of the light source and/or on the bottom of the housing and when through installation of heat ray absorbing walls, the computer and the control apparatus are shielded from the light source.

It is advantageous when the housing under the light source is closed by a netting through which the cool air can escape downwardly.

For an additional cooling of the liquid crystal display with the air circulated by the ventilator of the overhead projector, it is advantageous when the frame for the liquid crystal display has feet, at least on the side opposite the hinges, and when on one side of the border of the upper surface of the housing of the overhead projector, preferably on the side provided with the hinges, there is provided a slot for passage of cool air and its entry into the space between the writing plate and the liquid crystal display.

The overhead projector constructed in this manner is suitable for the long time projection of liquid crystal displays. Hence, this overhead projector can also be used instead of a projection screen. For this, it is advantageous when the projector head is arranged to turn about a vertical axis so that, as need be, it can project not only rearwardly but also in the line of sight of the overhead projector operator and in any other desired direction. The overhead projector can then in office use be substituted instead of a projection screen whereby the overhead projector is placed so that it illuminates a projection wall in the field of vision of one who operates the computer. While the long time work on the projection screen is tiring and can injure the eyes, these objections are not present in optical projection.

It is advantageous when the fastening means for holding the liquid crystal display in raised position is a holding magnet.

It is advantageous when a plug junction for a keyboard is provided on the housing.

There is also the possibility that the keyboard or a holder for the keyboard is hingedly mounted on the housing with hinges on the lower edge of the housing. It is here particularly advantageous when the housing has a recess or an inwardly recessed side or front wall for the hinged keyboard so that the bottom of the inwardly swung keyboard forms the front side or a part of the front side of the projector housing.

Moreover, it is advantageous when the support arm is arranged centrally and the hinges for the frame of the liquid crystal display are arranged on both sides.

With this construction it will be observed that the hinge axis of the support arm is arranged so high above the writing plate that between the writing plate and the downwardly swung support arm there is room for the LCD and its frame.

Figure 1:
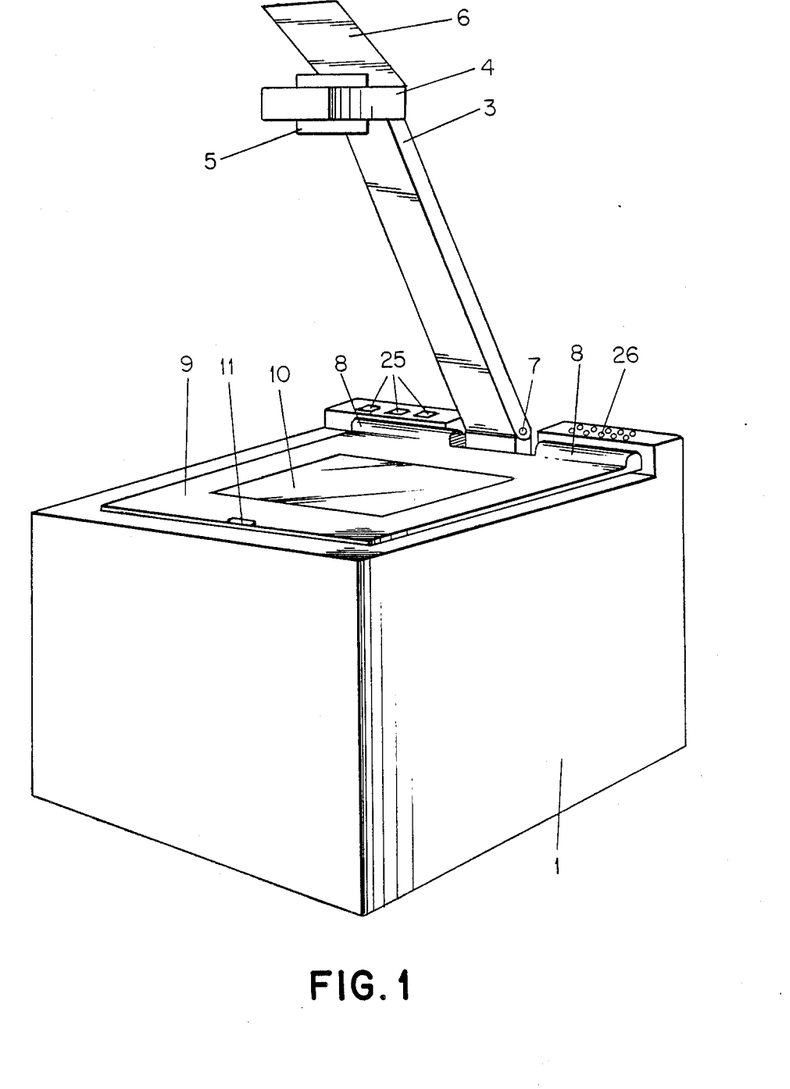
Figure 2:
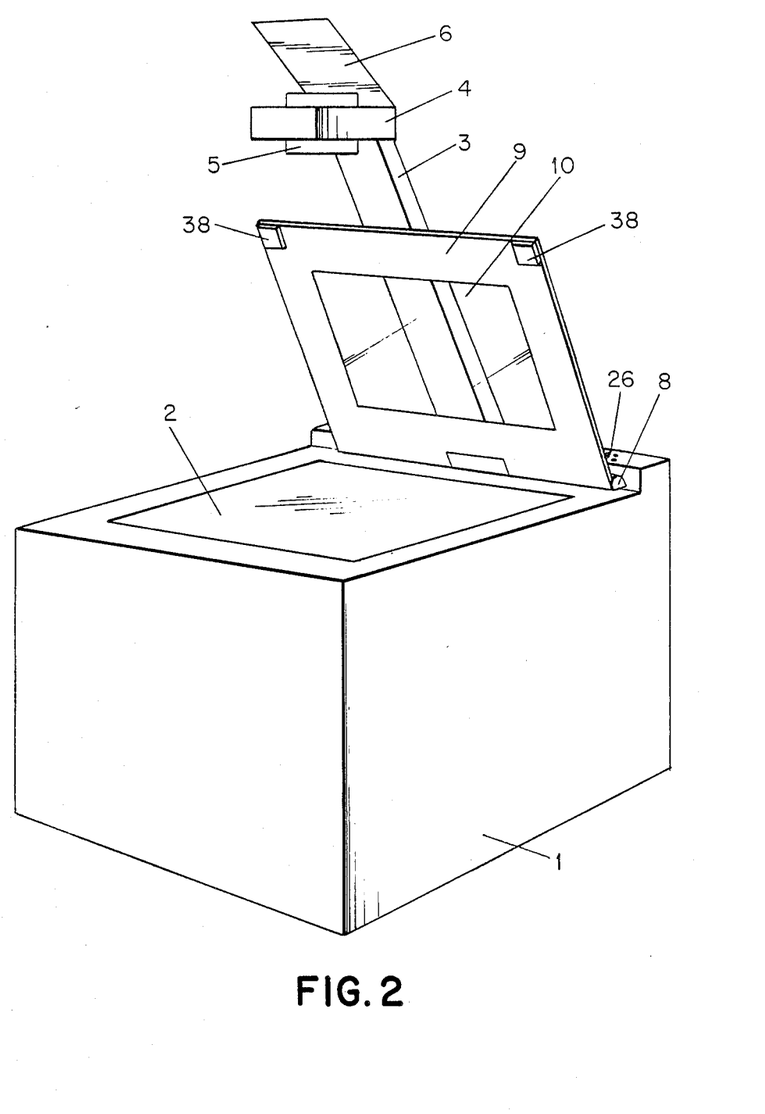
Figure 3:
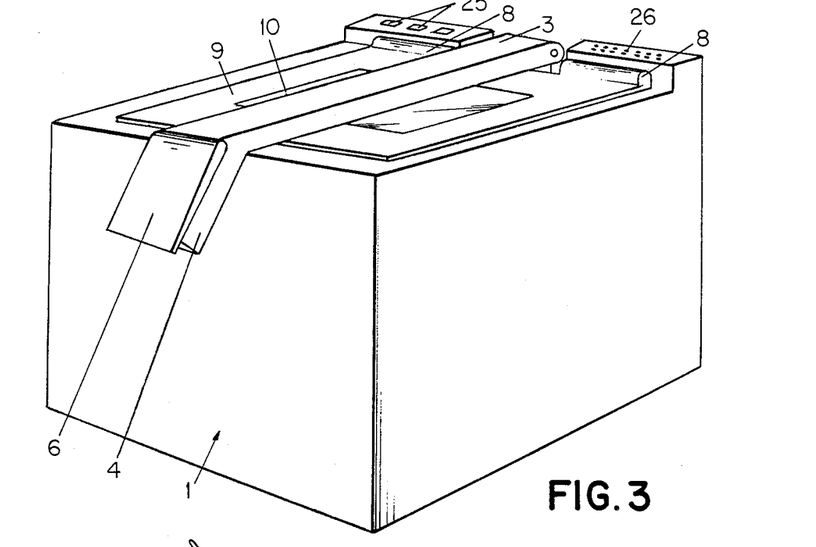
Figure 4:
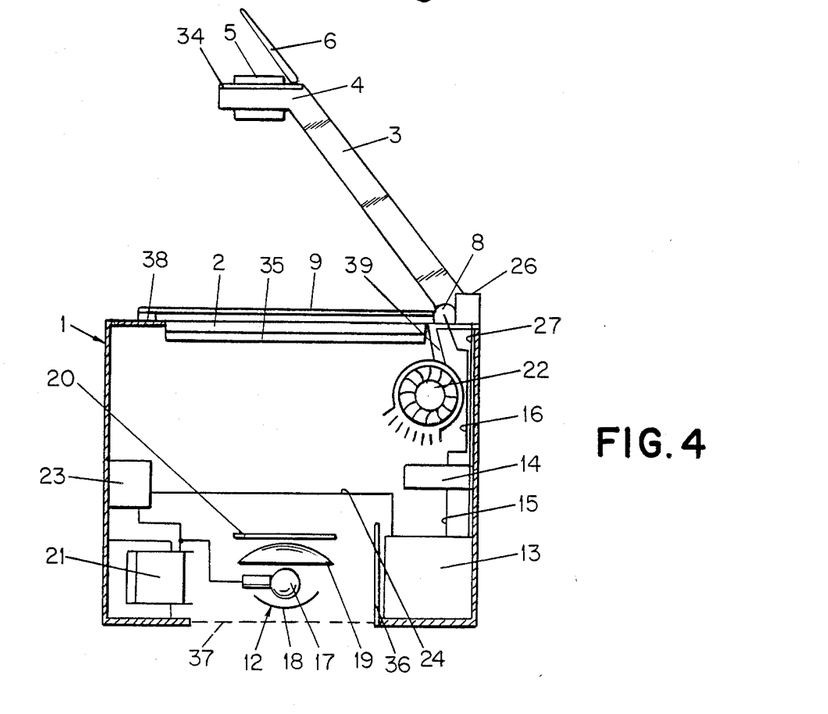
Figure 5:
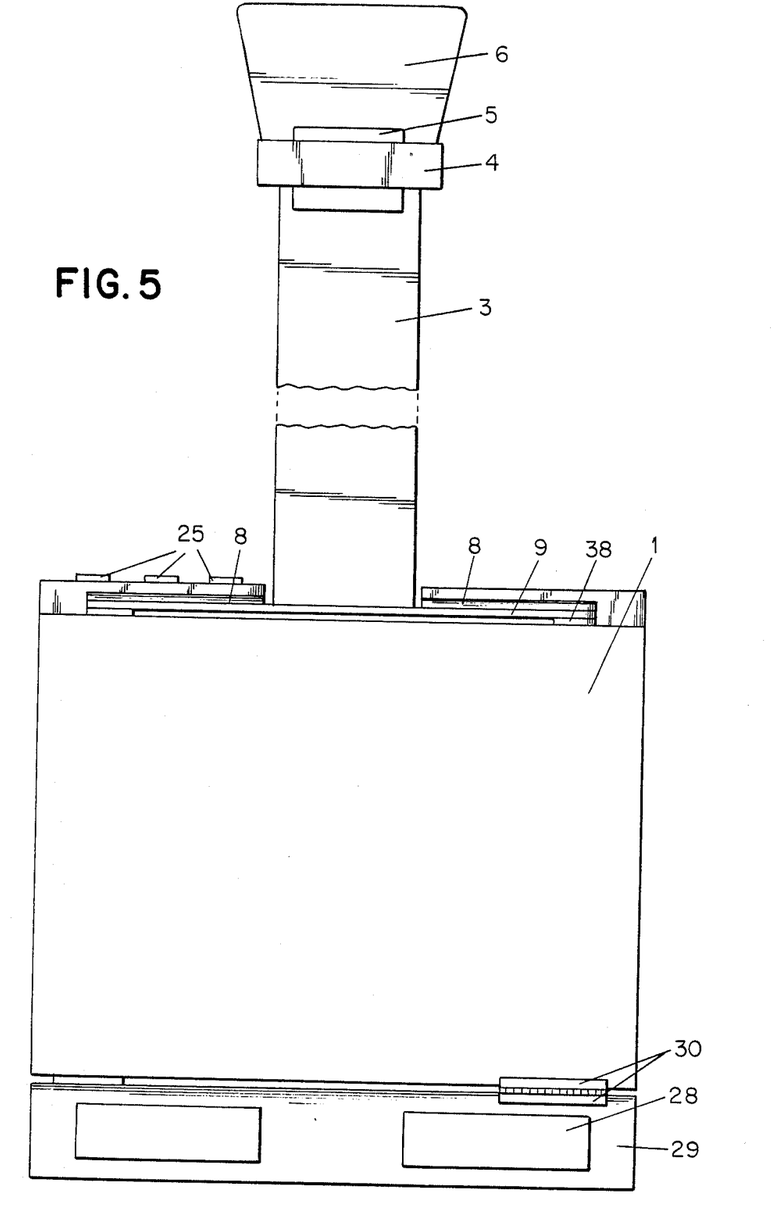
Figure 6:
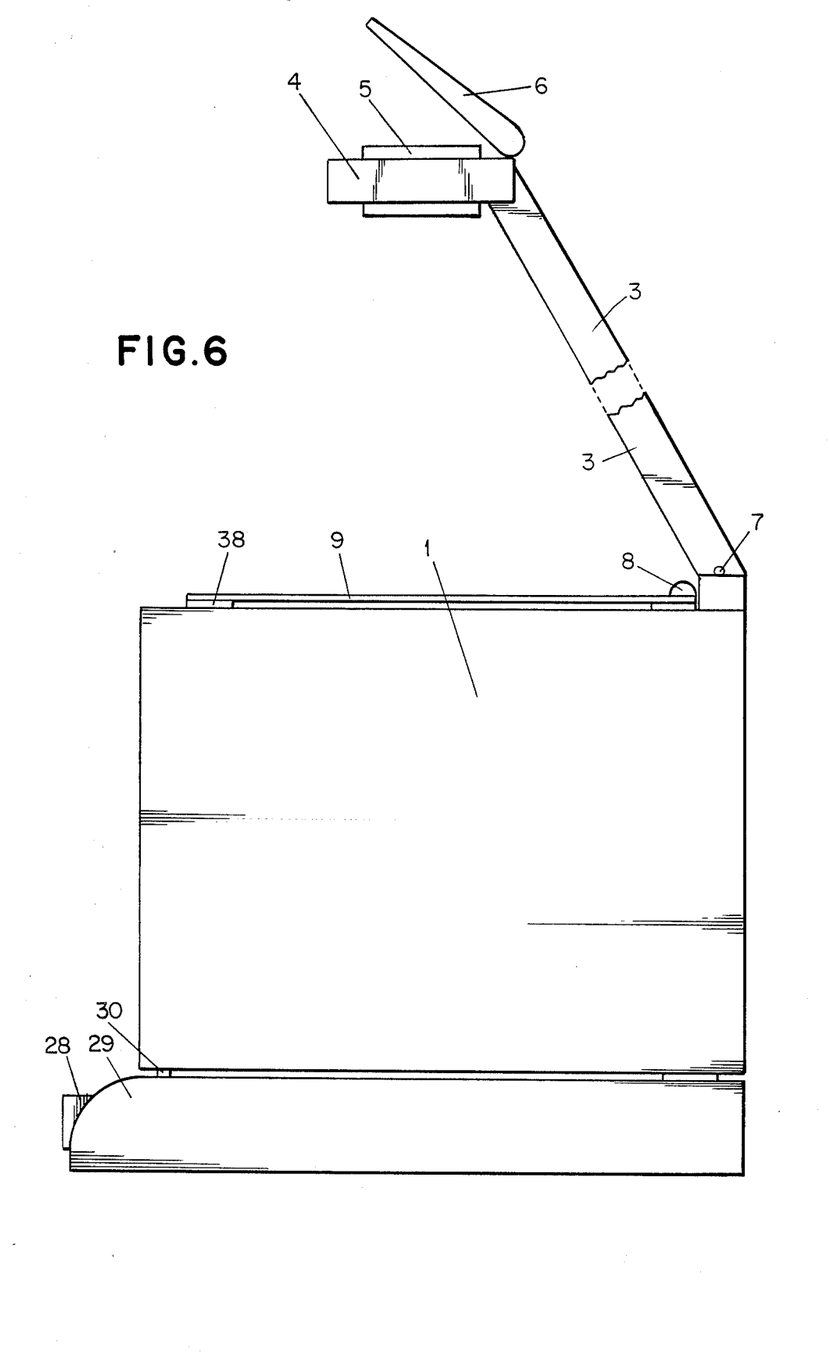
Figure 7:
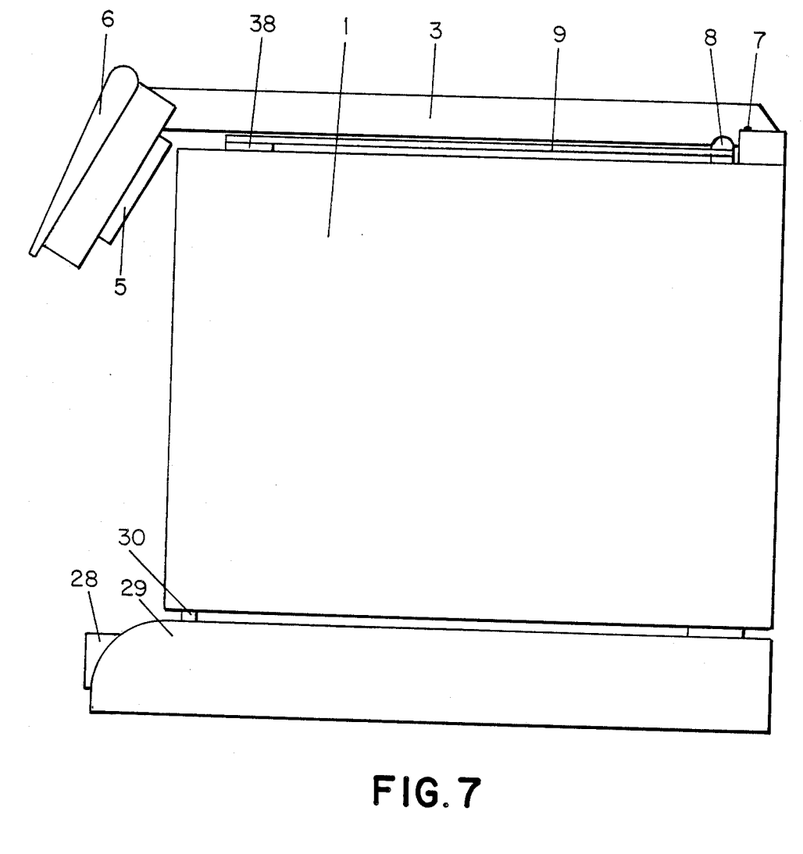
Figure 8:
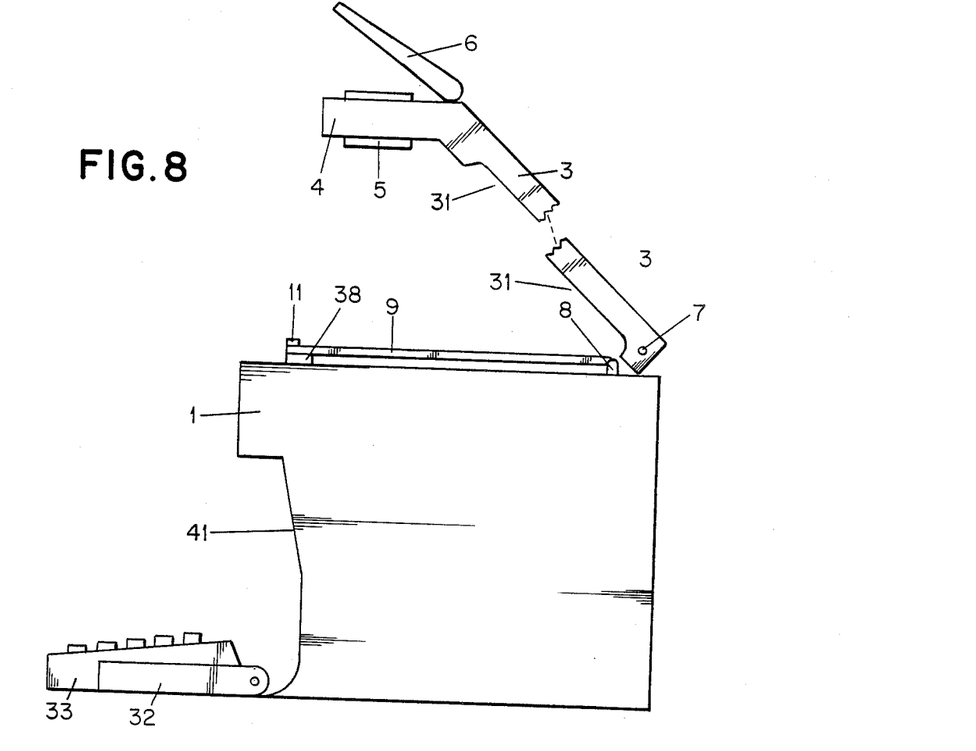
Figure 9:
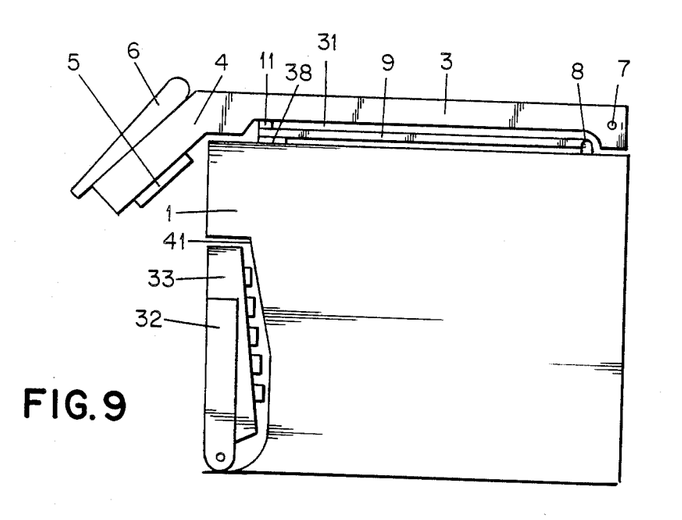

The problem of suitable accommodation for the liquid crystal display can also be solved, that the support arm has on the side facing the writing plate a recess which is so deep that between the writing plate and the downwardly swung support arm there is room for the LCD and its frame. The essence of the invention is more fully explained in the following description of embodiments schematically illustrated in the accompanying drawings. They show: FIG. 1 A perspective view of an overhead projector with a built-in computer and control unit with the display shown in projection position. FIG. 2 The overhead projector of FIG. 1 with the display swung up. FIG. 3 The projector of FIG. 1 in travel position. FIG. 4 The projector of FIG. 1 in cross-section. FIG. 5 Another overhead projector with a computer arranged under the projector housing in an additional housing in front view, the display being in use. FIG. 6 A side view of the projector of FIG. 5 with the display swung up. FIG. 7 The projector of FIG. 5 in travel position in side view. FIG. 8 An overhead projector in a design with an attached hinged keyboard in operation. FIG. 9 The embodiment of the projector of FIG. 8 in travel position. The overhead projector has a housing 1 of which its upper side is closed by the transparent writing plate 2. On the rearward upper edge of the projector is mounted the support arm 3 for the projection head 4 which carries the objective 5 and the deflection mirror 6. The support arm 3 is mounted on the housing by means of a hinge shaft 7 and is, therefore, foldable to a travel position which is illustrated in FIG. 3.

On both sides of the support arm 3 there are provided on the rearward upper edge of the projector hinges 8 for the frame 9 of the liquid crystal display 10. This frame 9 is, therefore, together with the liquid crystal display 10, swingable. In FIG. 1 it is in projection position close over the writing plate 2 but is spaced from the writing plate by feet or spacers 38, in FIG. 2 it is swung up. On the frame 9 on the side opposite the hinges 8 there is mounted a holding magnet 11 which holds the frame 9 with &:he liquid crystal display 10 in the swung up position shown in FIG. 2 so that on the writing plate without the liquid crystal display 10 projection films can be laid and projected.

Inside the housing 1, the computer 13 and the control unit 14 are mounted laterally of the light source 12. The computer is, with its outlet, connected by the cable 15 with the control unit 14 and the control unit 14 is connected by the cable 6 with the liquid crystal display 10. This cable 16 is led into the hinge between the support arm 3 and the hinge 8 and then runs into the frame 9 of the liquid crystal display where this cable is connected with the not represented in detail electrodes of the liquid crystal display.

The light source 12 comprises the lamp 17 with which is associated a reflector 18 which is a cold light reflector and permits passage of red and infrared components of the light downwardly and thus removed from the light beam. In the bottom of the housing 1 below the lamp 17 there is netting 37. Above the lamp, the condenser 19 is arranged. Close over this, is arranged a coated glass plate 20. On the side turned toward the lamp 17, there is a coating which reflects the red component of the light and in particular the infrared rays, while on the side turned away from the lamp 17 there is an anti reflection coating.

The lamp 17 is fed through the power supply 21 for the projector and the ventilator 22 which is mounted in an upper rear part of the housing 1. Through a duct 39, the ventilator draws air from the space between the liquid crystal display 10 and the writing plate 2. The air is discharged down toward the lamp 17 and flows out through the netting 37 in the bottom of the housing. On the output side of the power supply 21 is connected a further power supply 23 which over the cable 24 supplies the computer 13 add the control unit 14 with current. Instead of the power supply, a simple transformer can also be used when desired.

The control press keys 25 for the projector with which the lamp and the ventilator and also the computer and the control unit are put into operation, are arranged behind the hinge 8 at the same level as the upper edge and indeed on one side of the support arm while on the other side in corresponding position there is provided a plug-in receptacle 26 for the connection of a keyboard to the computer. From this plug-in connection 26, a cable 27 leads to the input of the computer.

In the embodiment of FIG. 5 to FIG. 7, there is shown a projector in which the computer 13 with its interchangeable memory units (e.g. discs) 28 is accommodated in a special computer housing 29 underneath the housing 1 of the overhead projector. The computer housing 29 is connected with the housing 1 by at least one cable plug-in connection 30. In this embodiment the hinge axis 7 of the support arm 3 is located lower. Hence, the support arm 3 has a recess 31 which receives the frame 9 and the liquid crystal display 10.

In the embodiment of FIGS. 8 and 9 there is mounted on the housing 1 of the overhead projector a hinged mounting support 32 for a keyboard 33 which is swung up in the travel position so that the keyboard is protected and covered, while it is swung down for operation.

The projection head 4 is mounted on the support arm 3 by a rotary mount which permits the projection head 4 to be adjusted so that the picture can be projected in any desired direction. Beneath the writing plate 2 there is arranged a Fresnel lens 35 in the path of the rays.

I claim:

1. An overhead projector comprising a housing having at its upper side a Fresnel lens and a writing plate overlying said Fresnel lens;
   a support arm extending up from a rear side of said housing,
   a projection head comprising an objective and a deflection mirror mounted on said support arm in a position above said housing,
   a light source comprising a lamp, reflector and condenser lens disposed in said housing in position to direct light up through said Fresnel lens and writing plate to said projection head,
   liquid crystal display means in a frame hingedly mounted on said housing by hinge means at said rear side of said housing for swinging between a lower position overlying said writing plate for projection of an image defined by said liquid crystal display means and a raised position in which said liquid crystal display means is in an upright position adjacent said support arm and is thereby out of a light path between said writing plate and said projection head for projection of an image on said writing plate,
   fastening means for releasably securing said liquid crystal display means in said raised position,
   means in said housing for controlling said liquid crystal display means and
   flexible means for electrically connecting said liquid crystal display means with said controlling means.

2. An overhead projector according to claim 1, in which said controlling means of said liquid crystal display means further comprises a computer disposed in an auxiliary housing forming a base for said housing.

3. An overhead projector according to claim 1, comprising common power supply means for supplying power to said light source and said liquid crystal 4. An overhead projector according to claim 1, in which a glass plate disposed just above said condenser lens is coated on the side turned toward said condenser lens with a layer which reflects red and infrared components of light from said lamp and on the side turned away from said condenser lens is coated with an antireflecting layer.

5. An overhead projector according to claim 1, in which said controlling means of said liquid crystal display means is disposed in said housing laterally of said light source and is shielded from said light source by heat-absorbing partition means.

6. An overhead projector according to claim 1, in which said housing is closed under said light source by netting.

7. An overhead projector according to claim 1, in which means is provided for spacing said liquid crystal display means from said writing plate when in said lower position to provide an air-flow space between said liquid crystal display means and said writing place and in which ventilating means in said housing draws air through said air-flow space to cool said liquid crystal display means.

8. An overhead projector according to claim 1, in which said fastening means for releasably securing said liquid crystal display means in said raised position comprises a holding magnet.

9. An overhead projector according to claim 1 further comprising a keyboard connected with said controlling means of said liquid crystal display means.

10. An overhead projector according to claim 9, in which said keyboard is hingedly mounted on said housing by hinge means at a front lower edge of said housing for swinging between and operative position and a stored position up against said housing 11. An overhead projector according to claim 10, in which a front side of said housing is recessed to receive said keyboard in said stored position and in which said keyboard has a bottom which forms a front for said housing when said keyboard is in stored position.

12. An overhead projector according to claim 1, in which said upper arm is disposed centrally of said rear side of said housing and in which hinge means for hingedly mounting said liquid crystal display means on said housing comprises hinge means on opposite sides of said support arm.

13. An overhead projector according to claim 12, in which support arm is hingedly mounted on said housing by hinge means for swinging between an upright position and a folded position overlying said liquid crystal display means.

14. An overhead projector according to claim 13, in which said support arm has on an forward side thereof a recess for accommodating said liquid crystal display means when said support arm is in said folded position.

15. An overhead projector according to claim 12, in which said housing has rearwardly of said writing plate and said liquid crystal display means, raised marginal portions disposed on opposite sides of said support arm and accommodating operation control switch means and plug-in connecting means.

* * * * *